July 28, 1936.                C. HOLL                2,049,378

CASE FOR ROUGE STICKS

Filed March 31, 1934

INVENTOR.

Charles Holl
By William C. Linton
       Atty.

Patented July 28, 1936

2,049,378

UNITED STATES PATENT OFFICE 2,049,378

CASE FOR ROUGE STICKS

Charles Holl, Paris, France

Application March 31, 1934, Serial No. 718,465
In France May 9, 1933

3 Claims. (Cl. 132—79)

The present invention relates to cases for rouge sticks for the lips, in which the stick of rouge is carried in a socket provided with a push-piece and adapted to slide lengthwise in a tubular sleeve forming the main body of the case itself.

When the rouge stick is not in use, the sleeve is covered with a cap which fits against the rest of the case.

In conformity with the invention, the cap of the case is combined with a small mirror mounted on the cap by a single or double hinge, so that the mirror may be turned either aside from the cap, or close to the latter.

The body of the case, or the cap, comprises a device so arranged as to hold the mirror along the side of the cap when the latter is fitted in position. According to a preferred form of construction, the push-piece used for the stick is provided with a notch adapted to engage the edge of the mirror, which is thus held in place as long as the cap covers the case.

A form of construction of case for rouge sticks, in conformity with the invention, is shown in the accompanying drawing.

Figure 1:
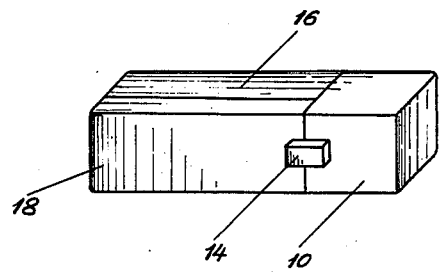
Fig. 1 is a perspective view of the case in the closed position.
Figure 2:
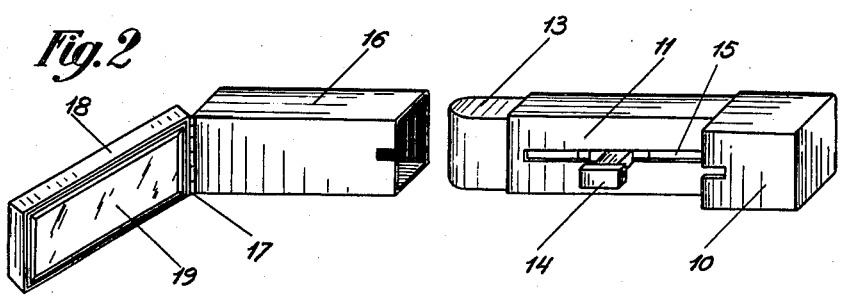
Fig. 2 is a view showing the case open and the mirror hinged back.

The case represented in these figures comprises in the usual manner a main body 10 of rectangular cross-section, extended by a sleeve 11, also of rectangular shape, but having a smaller cross-section.

In the sleeve 11 is slidable, with a certain friction, a socket 12 adapted to receive the stick of rouge 13.

The socket 12 is provided with a push-piece 14 which extends through the sleeve 11 through a longitudinal slot 15 and forms at the exterior of the case, a projection by which the same can be pushed by the finger.

When the device is not in use, the sleeve 11 is covered by a cap 16 of corresponding section, which entirely covers the sleeve in such way as not to form any projecting part with reference to the main body 10 of the case (Fig. 1).

In conformity with the invention, the said cap has hinged to it at 17 the frame 18 of a mirror which is plane or preferably somewhat convex, and the hinge 17 should be arranged so that the mirror may pivot through about 150°, this being a convenient position for use.

Figure 3:
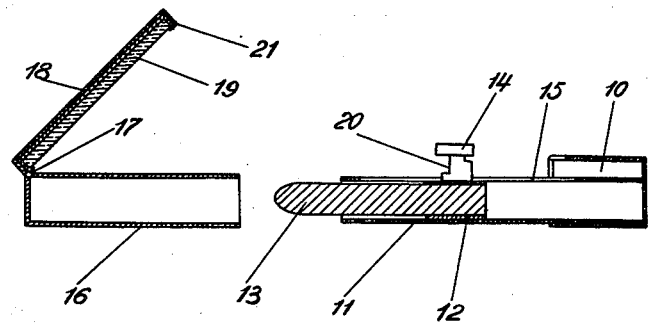
Fig. 3 is a lengthwise section of the case in the open position.
Figure 4:
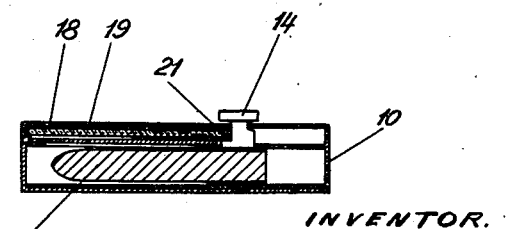
Fig. 4 is a like section of the case in the closed position.

It is preferable that when the case is closed and covered by the cap 16, the mirror should not swing, and for this purpose, according to the form of construction represented, there is provided on the push-piece 14, as shown in Fig. 3, a notch 20 adapted for the engagement, as shown in Fig. 4, of the front edge 21 of the frame 18, and thus the push-piece serves as a fastening device for the mirror.

However, it is obvious that the invention is not limited to the form of construction above described, and in particular, the mirror can be held in the closed position by any other suitable device mounted upon the main body of the case, or even upon the cap. On the other hand, the hinge of the mirror 19 may be made double, in order to avoid any projection on the plane of the cap.

I claim:

1. A rouge stick casing, a rouge stick slidably mounted therein, a knob connected to the rouge stick whereby the latter may be manually moved within said casing, a cap for said casing, a frame hingedly connected to said cap for supporting a mirror, and said knob adapted to engage said frame for preventing the swinging movement thereof upon its hinged connection.

2. A rouge stick casing, a knob slidably mounted thereon and connected to the rouge stick thereof, a cap for said casing, a frame hingedly connected to said cap having a mirror mounted thereon, and said knob adapted to engage said frame for preventing swinging movement thereof upon its hinged connection.

3. A rouge stick casing having an opened end, a rouge stick arranged within said casing and having one end projecting therefrom, a bezeled knob slidably mounted within said casing and connected to the rouge therein, a cap for said casing adapted to cover the projecting end of the rouge, a frame hingedly connected to said cap for supporting a mirror, and said bezeled knob adapted to engage said frame for preventing the swinging movement thereof upon its hinged connection.

CHARLES HOLL.